United States Patent [19]

Negi et al.

[11] 4,218,739

[45] Aug. 19, 1980

[54] DATA PROCESSING INTERRUPT APPARATUS HAVING SELECTIVE SUPPRESSION CONTROL

[75] Inventors: Virendra S. Negi, Pepperell; Ming T. Miu, Chelmsford, both of Mass.

[73] Assignee: Honeywell Information Systems Inc., Waltham, Mass.

[21] Appl. No.: 736,657

[22] Filed: Oct. 28, 1976

[51] Int. Cl.² ............................................... G06F 9/18
[52] U.S. Cl. ................................................... 364/200
[58] Field of Search ..................... 340/172.5; 445/1; 364/200 MS File, 900 MS File

[56] References Cited

U.S. PATENT DOCUMENTS

| Re. 28,221 | 11/1974 | Benghiat ............................ 340/172.5 |
| 3,286,239 | 11/1966 | Thompson et al. ................. 340/172.5 |
| 3,399,384 | 8/1968 | Crockett et al. ................... 340/172.5 |
| 3,560,935 | 2/1971 | Beers ................................. 340/172.5 |
| 3,710,324 | 1/1973 | Cohen et al. ...................... 340/172.5 |
| 3,711,835 | 1/1973 | Jaegger et al. .................... 340/172.5 |
| 3,735,357 | 5/1973 | Maholick et al. ................. 340/172.5 |
| 3,825,902 | 7/1974 | Brown et al. ..................... 340/172.5 |
| 3,828,327 | 8/1974 | Berglund et al. ................. 340/172.5 |
| 3,866,181 | 2/1975 | Gayman et al. ................... 340/172.5 |
| 4,000,485 | 12/1976 | Barlow et al. ..................... 340/172.5 |
| 4,001,784 | 1/1977 | Bardotti ............................ 340/172.5 |

*Primary Examiner*—Melvin B. Chapnick
*Attorney, Agent, or Firm*—Finnegan, Henderson, Farabow, Garrett & Dunner

[57] ABSTRACT

Interrupts generated within a data processor (internal interrupts) and an interrupt received from a peripheral device (external interrupts) coupled with the processor are prioritized and, unless suppressed, are coupled to generate an interrupt signal for use in addressing a routine for servicing the particular highest priority requesting internal or external interrupt. All further interrupts are suppressed during the time required to service the interrupt and, depending upon the type of interrupt, either the internal or external interrupt may be suppressed for one or two instruction times for debug purposes or under computer program control as required for a particular operation.

12 Claims, 4 Drawing Figures

DATA PROCESSING INTERRUPT APPARATUS HAVING SELECTIVE SUPPRESSION CONTROL

RELATED APPLICATIONS

The following United States Patent Applications are incorporated herein by reference:
1. DATA PROCESSING SYSTEM HAVING DISTRIBUTED PRIORITY NETWORK
   Inventor - George J. Barlow U.S. Pat. No. 4,030,075 Filed June 14, 1977
2. ARCHITECTURE FOR A COMMON BUS COUPLED IN A DATA PROCESSING SYSTEM
   Inventors - Frank V. Cassarino et al U.S. Pat. No. 3,993,981 issued Nov. 23, 1976
3. ADDRESS FORMATION IN A MICROPROGRAMMED DATA PROCESSING SYSTEM
   Inventors - William Woods et al U.S. Pat. No. 4,047,247 issued Sept. 6, 1977
4. WORD, BYTE AND BIT INDEXED ADDRESSING IN A DATA PROCESSING SYSTEM
   Inventors - Philip Stanley et al Ser. No. 674,698 Filed Apr. 7, 1976

BACKGROUND OF THE INVENTION

The present invention relates to data processing or computer systems and more particularly to interrupt apparatus associated with such data processing systems.

In data processing systems, interrupt facilities are required in order to acknowledge and thereafter service external events which occur during the normal course of operation of the computer system. Although the computer system is executing various operations under computer program control, nevertheless, depending upon the type of interrupt, such interrupt must be handled in an expeditious manner. Such interrupts such as that of the power failure type must be serviced immediately so as to enable the storage of, for example, the status of the system at the time of the power failure. On the other hand it is important that at certain times, such interrupts be suppressed so that certain functions in process may be carried out. For example, if interrupt service is being provided for a particular interrupt type, this should not be interrupted by yet a further interrupt. Depending upon the type of interrupt, it is often desirable to suppress such interrupt for one or more instruction times in order to, for example, enable the completion of a particular operation which may take one or more instructions to complete or to enable each operation to get started, Thus, it is important to give priority to the interrupt types and provide service for the highest priority active interrupt unless for other reasons, the interrupt must be suppressed for a given period of time.

It is accordingly an object of the present invention to provide improved interrupt apparatus for use in a data processing system, such interrupt apparatus having unique suppression capabilities.

SUMMARY OF THE INVENTION

The above and other objects of the invention are achieved by providing a data processing system which includes apparatus for receiving a plurality of controlled interrupts and apparatus for receiving a plurality of privileged interrupts. Further provided is apparatus for enabling the service of such interrupts. Also provided is first logic for suppressing either of the controlled or privileged interrupts received while a previously received one of such interrupts is being serviced and second logic for suppressing the controlled interrupts for a period of time related to the time required by the system to save the status thereof. Further apparatus is provided for generating an interrupt signal in response to an interrupt received and which is not suppressed by either the first or second logic for suppressing. In response to such interrupt signal and the identity of the interrupt, apparatus is enabled for commencing the interrupt service enabled by the apparatus for enabling.

DESCRIPTION OF THE DRAWINGS

The features and advantages of the invention will become more clearly apparent from the following description of arrangements, which are described solely as examples, and which are illustrated in the accompanying drawings in which.

DETAILED DESCRIPTION OF THE PREFERRED EMBODIMENT

Figure 1:
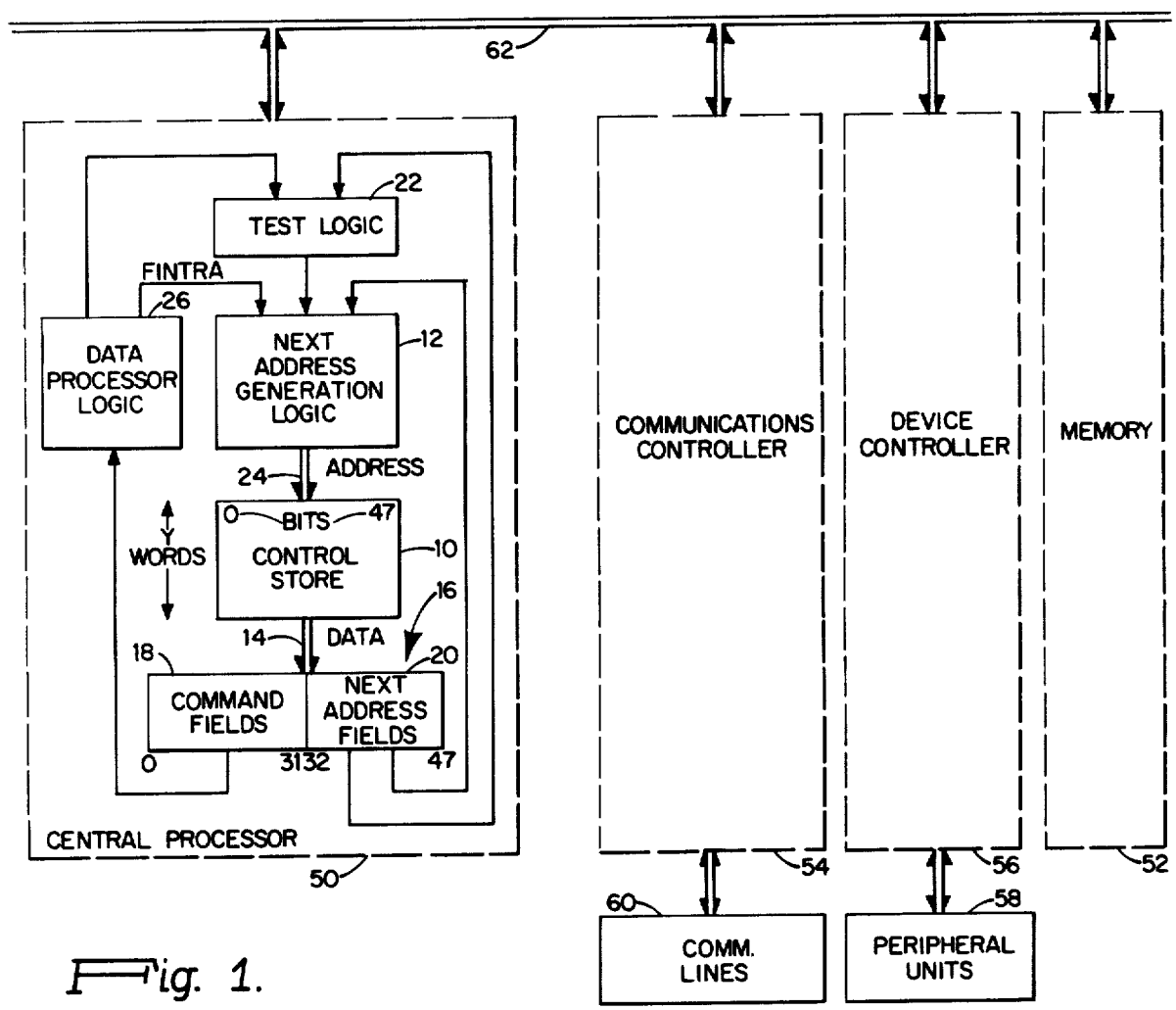
FIG. 1 illustrates the environment of the present invention.

FIG. 1 illustrates a general block diagram of the data processing system in which the present invention is incorporated. Such system basically includes a central processor 50, a memory 52, a communications controller 54 coupled with communication lines 60, a device controller 56 coupled with peripheral units 58, and a common electrical bus 62 coupling the four basic elements shown. The manner in which the bus 62 and such basic elements may be coupled is shown in detail in the U.S. Pat. Nos. 4,030,075 and 3,993,981, issued respectively on June 14, 1977 and Nov. 23, 1976, which patents are incorporated herein by reference.

The processor 50 includes the apparatus of the present invention, and further, generally includes a control store 10 which by way of example includes a plurality of words, Y in number, each of which words, sometimes referred to as so-called firmware words, include by way of example 48 bits (bits 0 through 47). Control store 10 is addressed by means of next address generation logic 12 which may by way of example be that next address generation logic described in United States Patent Applications, Ser. Nos. 674,517 and 674,698, both filed on Apr. 7, 1976, which applications are incorporated herein by reference.

Figure 2:
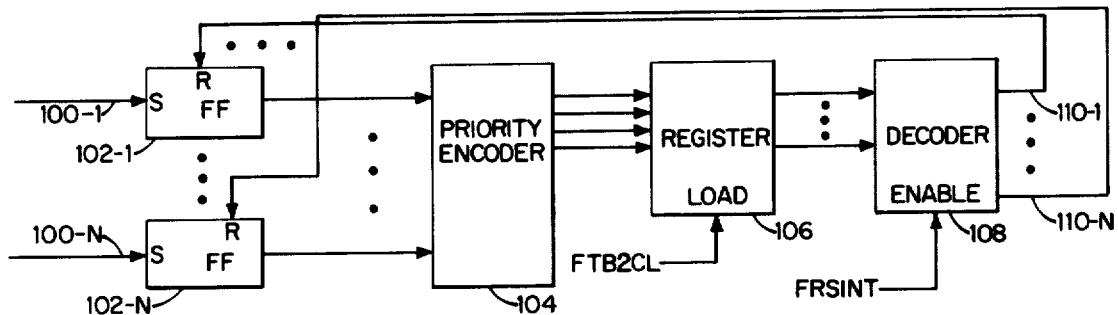
FIG. 2 illustrates the interrupt priority logic of the present invention.
Figure 3:
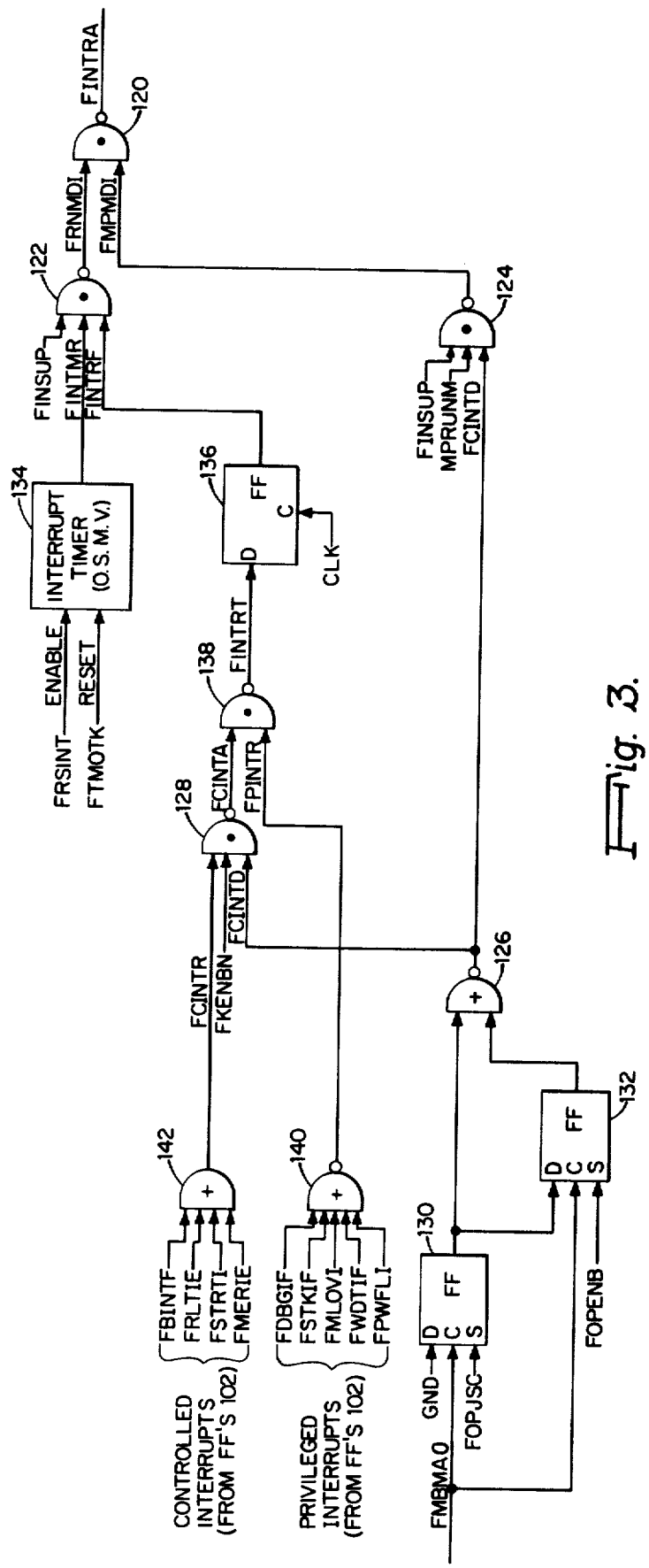
FIG. 3 illustrates the interrupt suppression logic of the present invention.
Figure 4:
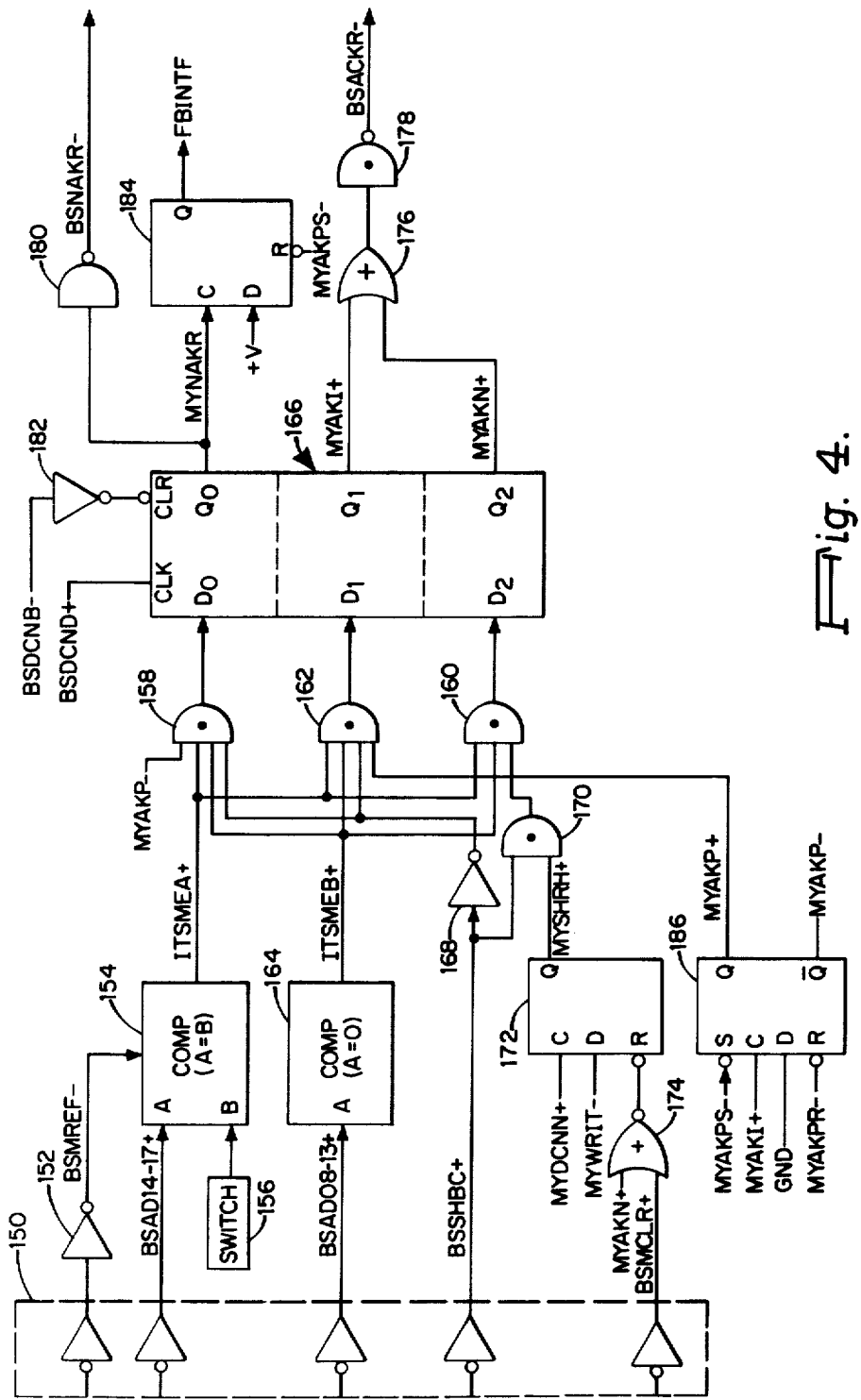
FIG. 4 illustrates the interrupt interface apparatus of the present invention.

The firmware word addressed in control store 10 is received via data lines 14 in control store register 16. Control store register 16 basically comprises two portions, namely, the command fields 18 and the next address fields 20. By way of example, command fields 18 include 32 bits (bits 0-31) and next address fields 20 include 16 bits (bits 32-47). The address information in the next address fields 20 is utilized to address control store 10 in combination with the test logic 22 and the next address generation logic 12. Test logic 22 is also described by way of example in the two above-reference U.S. Pat. having Nos. 4,030,075 and 3,993,981. For example, some of such bits in the next address fields 20 may be utilized to provide a base address via logic 12 whereas certain address information included in the address fields may be sent directly to test logic 22. The output of test logic 22 is combined with the other input to logic 22 to provide the address via lines 24 to address control store 10. The other input to test logic 22 is received from data processor logic 26 which may, for example, include all other logic included in the data processing system, including the apparatus of the present invention as shown in FIGS. 2, 3 and 4. For example, in addition to the interrupt handling apparatus of the present invention, such logic 26 includes an arithmetic unit and various registers included in the system which provide the operation intended for the system in response to the command information included in the command fields 18. Based on the operation provided by such data processor logic 26, it may direct certain test information to logic 22 or logic 12 which utilizes that information to address control store 10.

Data processor logic 26 may, for example, also include a so-called watchdog timer which is useful for indicating a malfunction in the system. If the watchdog timer interrupt or other time out signal is received, then instead of addressing the next intended firmware word in control store 10, a firmware word may be addressed so as to enable the service of such interrupt condition.

In addition to the watchdog timer interrupt, there are many other interrupts which may be generated within the processor 50 itself. Such interrupts include, for example, controlled interrupts and privileged interrupts, as herein discussed. Controlled interrupts have a lower priority than the privileged interrupts. The privileged interrupts are serviced in some situations, for example, where the controlled interrupts may not be serviced due to other conditions. The watchdog timer interrupt is classified in the privileged interrupts category. Other privileged interrupts may by way of example include a power failure interrupt, a so-called memory lock-out interrupt, a memory stack violation interrupt and a debug interrupt. Controlled interrupts may by way of example include those generated by the so-called real time clock, the memory, an execute switch in a control panel and those interrupts received from other devices over the common bus 62.

As indicated for the logic of FIG. 3, these interrupts are coupled to generate a so-called interrupt signal (FINTRA) which is utilized by means of the control store 10 to enable an interrupt service routine for the interrupt. More particularly once the interrupt is received and if it is the highest priority interrupt, it will be latched as provided by the logic of FIG. 2 and thereafter the interrupt, whether it be a controlled interrupt or a privileged interrupt, will, if not suppressed, as discussed with respect to FIG. 3, generate the interrupt signal FINTRA. As shown in FIG. 1, the FINTRA signal is coupled to next address generation logic 12 which may be designed in accordance with the teachings of the two above-referenced applications filed on Apr. 7, 1976. The receipt of the FINTRA signal will cause a predetermined portion of the control store 10 to be addressed via next address generation logic 12. In turn, depending upon the interrupt type, the control store will generate an address to enable the particular interrupt service routine for the type interrupt indicated in the latched indication of FIG. 2, to service such interrupt. Such address so generated, enables the addressing of the corresponding interrupt service routine which may be stored in memory 52. As indicated with respect to FIG. 3, no interrupts are allowed during the time that this interrupt service is performed, basically because of the enabling of interrupt timer 134 in FIG. 3. Once the interrupt service is complete, or at the end of the time set by the one-shot multivibrator mechanism of the interrupt timer 134, further interrupts are allowed or more particularly such interrupts received during the time that the interrupt service routine was performing, are no longer suppressed unless other conditions prevail.

With reference to FIG. 2, the plurality of interrupts are received on lines 100-1 to 100-N. Each line 100 is coupled to different interrupt sources and are coupled to set the respective flip-flops 102-1 to 102-N. Flip-flops 102 are set in an asynchronous manner. The outputs thereof are coupled to a priority encoder 104 which is coupled to prioritize the respective inputs of flip-flops 102 with the top most input being the highest priority and the bottom most input being the lowest priority. The encoded signal is provided at the output thereof to register 106. The encoded output of encoder 104 is not loaded into register 106 however until the clock time as hereinafter described. By way of example, priority encoder 104 may be an integrated circuit manufactured and marketed by Texas Instruments Incorporated under the Model No. SN 74148. With eight inputs to priority encoder 104, four lines are provided at the output thereof. The top three lines include an encoding of the one of eight inputs so that if flip-flop 102-1 is set and accordingly the highest priority interrupt, then all binary ZEROs will be on the three output lines of encoder 104 or if the lowest priority interrupt received by encoder 104 is to be served, then the top three output lines are each a binary ONE. The fourth line is provided so as to determine whether or not the cause of the interrupt is from one of the interrupt sources coupled with lines 100, which interrupts are internal to the central processor, or whether or not the interrupt is received over the common electrical bus coupled with not only the central processor but the plurality of other devices coupled with the bus. This operation will be described hereinafter. Thus, even though the top three lines at the output of encoder 104 are all binary ZEROs, depending on the state of the fourth line, the interrupt is either external or received from line 100-1. The privileged interrupts have the highest priority and are therefore received at the high priority interrupt of encoder 104, whereas the controlled interrupts having a lower priority than the privileged interrupts, are received at the lower priority inputs.

The encoded output of priority encoder 104 is loaded into register 106 in response to a clock signal FTB2CL so that the interrupt which has been selected by the encoder 104 will not be lost or confused with other interrupts which may be present at the input of encoder 104. The contents of register 106 will not be disturbed until the occurrence of the next such clock signal. The FTB2CL signal may be generatd by an addressed instruction word in the control store when at least one instruction which has occurred in the interrupt service routine has been operated on.

The output of register 106 is coupled not only to decoder 108 but also to the next address generation logic used in addressing the control store, as hereinafter described. By way of example, the four inputs to decoder 108 are decoded to generate a signal on one of the eight output lines 110-1 to 110-N or are not generated at all if in fact this is an interrupt received from the common bus 62. Such signal occurring on one of lines 110 will cause its respective flip-flop to be reset. This makes such flip-flop available for further interrupt processing. It should be noted that decoder 108 will not provide such output until it is enabled by the FRSINT signal which in addition is utilized to start the interrupt timer clock as hereinafter discussed. The FRSINT signal may be generated by the control store at the beginning of an interrupt service routine.

Now referring to FIG. 3, the detailed interrupt logic of the present invention is shown. The interrupt signal FINTRA is shown at the output of NAND gate 120. When true, i.e. a binary ONE, the interrupt signal FINTRA causes the next address generation logic to service the interrupt once the current instruction is executed. The interrupt signal is generated in response to either the so-called running mode interrupt signal FRNMDI or the maintenance panel interrupt signal FMPMDI. These signals are respectively generated at the outputs of NAND gates 122 and 124. The FINTRA signal when true is in the binary ONE state and is in such state if either of the two inputs to NAND gate 120 are in the binary ZERO state. The NAND gate 124 includes three inputs, one of which is the interrupting signal generated by, for example, an operator at the maintenance panel of the computer system. The other two inputs to NAND gate 124 are the interrupt suppression signal (FINSUP), and the control interrupt delay signal (FCINTD). There will be a suppress or a delay of the interrupt if either of these signals is in the binary ZERO state. This causes a binary ONE state at the output of NAND gate 124. When such signals FINSUP and FCINTD are in the binary ONE state, then if the MPRUNM signal is in the binary ONE state, an interrupt will be enabled. The interrupt suppression signal FINSUP may be generated under firmware control during the operation of a so-called major branch sequence and more particularly is utilized to suppress interrupts for at least one instruction time, at that time, for example, when an interrupt is present at the same time that a processor start command is present. The interrupt will thus be suppressed for one instruction time so that the program has a chance to start executing. The major branch sequence begins any time there is an interrupt or extraction from the control store of a given type of instruction.

The FCINTD signal is generated at the output of NOR gate 126, the output of which is coupled to one input of NAND gate 128. The FCINTD signal is a binary ONE if there is to be no delay in the generation of an interrupt. There will be a delay in the generation of an interrupt if in fact either of flip-flops 130 or 132 has been set. If only flip-flop 132 has been set, then the interrupt will be suppressed for one instruction time, whereas if flip-flop 130 has been set, the delay will be two instruction times. Flip-flop 130 will be set in response to a jump store instruction (FOPJSC) which instruction is usually found in most general purpose computers. This disables interrupts from occurring for two instruction times because of the interaction with flip-flop 132 between the output of flip-flop 130 and the D input of flip-flop 132. Flip-flop 130 will be effectively reset if a firmware major branch (FMBMAD) is indicated at any particular time. This is accomplished by clocking in the binary ZERO state (GND) at the D input of flip-flop 130 to the output thereby effectively disabling an interrupt. Flip-flop 132 when set causes a delay of one instruction time. Flip-flop 132 may be set by the FOPENB signal which is a software instruction enabling interrupts but only after a period of one instruction time has passed so as to give such software an opportunity to provide the processing required. Flip-flop 132 may also be set if flip-flop 130 had been previously set and a major firmware branch signal FMBMAO is generated, thereby enabling the delay of two instruction times in response to the FOPJSC signal.

The running mode interrupt signal FRNMDI also generates the interrupt signal FINTRA if in fact NAND gate 122 is not disabled. NAND gate 122 will disable the interrupt signal from being generated if the interrupt suppression signal FINSUP is a binary ZERO or if the interrupt timer signal FINTMR generated by interrupt timer 134 is a binary ZERO. The third signal input to NAND gate 122 is the FINTRF signal which is generated in response to either a controlled interrupt or a privileged interrupt received from flip-flops 102 in FIG. 2. The FINTRF signal is received at the output of flip-flop 136 which is included for synchronization purposes. Thus the signal at the D input of the flip-flop 136 is not transferred to the output thereof until the system clock signal is generated. The input of flip-flop 136 is the FINTRT signal which is received from the output of NAND gate 138 which has two inputs, the FCINTA signal which is generated if there is a controlled interrupt active and the FPINTR signal which is generated if a privileged interrupt is active.

The privileged interrupts are received via NOR gate 140 and are not suppressed, except via NAND gate 122, and accordingly an indication of the presence of one such interrupt may be clocked into flip-flop 136 at the next clock pulse. The controlled interrupts are suppressed however by the FCINTD signal generated at the output of NOR gate 126 as discussed hereinbefore or by the FKENBN signal which is a signal which may be generated under software control and accordingly may effectively disable any controlled interrupts for a period of time designated by the programmer using the software. Thus, the interrupt signal will be true, i.e. a binary ONE, at the output of NAND gate 120 if either one of the controlled interrupts is a binary ONE and accordingly a binary ONE is received at the output of OR gate 142 thereby activating the FCINTR signal. If both the FKENBN and FCINTD signals are also binary ONEs, and accordingly not suppressing the interrupt, i.e., the inactive state, then the FCINTA signal is generated at the output of NAND gate 128. The next system clock pulse enables flip-flop 136 via NAND gate 138 to store the fact that the FCINTA signal was a binary ZERO and accordingly a binary ONE is stored in flip-flop 136. When such clock pulse is generated and if the two top most suppression signals to NAND gate 122 are also binary ONEs, and since the FINTRF signal is a banary ONE, accordingly the FRNMDI signal is a binary ZERO thereby generating a binary ONE or true state for the interrupt signal FINTRA. The privileged interrupts operate in a like manner. That is, if either of the privileged interrupts is a binary ONE, then the output of NOR gate 140 will be a binary ZERO as was the case for the FCINTA signal when it was active. The operation continues as described just above when the FCINTA signal was active.

As shown in FIG. 3, interrupts may be generated from a plurality of sources including the controlled interrupts, the privileged interrupts and the maintenance panel interrupt. On the other hand it can be seen that such interrupts may be suppressed in a variety of ways. Such suppression signals include the FKENBN, the FCINTD, the FINSUP, and the FINTMR signals. As may be recalled, the FKENBN signal is software generated and may be activated for any length of time. The FCINTD signal is generated as previously indicated for one or two instruction times depending upon whether a jump store instruction or an enable interrupts instruction is received at flip-flops 130 or 132. The FINSUP signal is generated by firmware and is so generated typically if an interrupt is present at the same time that a central processor start command is received. It suppresses the interrupts for one instruction time so that the program is able to start executing. The FINTMR signal is generated by the interrupt timer 134 for a period of a time determined by the time it takes to process the largest of the various interrupt service routines, by way of example, 100 microseconds. This signal, FINTMR, is generated following the encoding of an interrupt as indicated in FIG. 2.

Each of these four interrupt suppression signals is utilized to suppress the controlled interrupts. Only the FINSUP and FINTMR signals are utilized to suppress the privileged interrupts whereas only the FCINTD and FINSUP signals are utilized to suppress the maintenance panel interrupt. Accordingly, only the FINSUP signal is utilized to suppress all three interrupts.

Now referring to FIG. 4, the manner in which the bus interrupt signal is generated thereby generating an interrupt signal as shown in FIGS. 2 and 3, shall now be discussed. Further details of the interface logic which may be utilized in the data processing system of the present invention, including interface logic for other types of central processors, peripheral devices and memories are shown in the two above-referenced applications filed June 30, 1975.

Now referring to the interrupt interface apparatus, i.e., bus coupling logic of FIG. 4, the signals are received from the bus by means of the receivers included in element 150. The memory reference signal BSMREF- is received by one of such receivers and inverted by means of inverter 152 and provided to one input of comparator 154 so as to enable such comparator if the address being received is not a memory address. One of the inputs for comparison by comparator 154 is the data processor address bits which in this case by way of example are four in number and are indicated as the BSAD14+ through BSAD17+ signals. This address received at one input of comparator 154 is compared with the address set by, for example, the hexadecimal switch 156 in the data processor itself. When the received address and the switch 156 provided address are compared and found to be equal, then comparator 154 generates the ITSMEA+ signal which partially enables gates 158, 160 and 162.

Further address bits BSAD08+ through BSAD13+ are received at the inputs of comparator 164 which determines whether or not these bits are all ZEROs. If they are all ZEROs, then the ITSMEB+ signal is generated to also partially enable gates 158, 160 and 162. Enabling of the further inputs of either gates 158, 160 and 162 will effectively set a respective flip-flop in element 166, which element includes three flip-flops.

One of the other inputs to gate 158 is a second half bus cycle BSSHBC+ signal which is coupled to gates 158 and 162 via inverter 168. The second half bus cycle signal is also received at one input of AND gate 170. The other input to gate 170 is from the Q output of the second half read history flip-flop 172. The second half read history flip-flop is utilized to remember that the data processor issued its MYDCNN+ signal, i.e., the setting of this device's grant flip-flop, as explained in the aforementioned patent applications filed on June 30, 1975, and that the central processor also sent the signal entitled MYWRIT-, which implies that the data processor is expecting a response cycle from the slave. Thus with such a two cycle operation, the second such cycle presents the expected data to the central processor, and the flip-flop 172 will identify this data as being that which the central processor requested by the fact that the history flip-flop 172 has generated the MYSHRH+ signal at the Q output thereof. Flip-flop 172 is reset via NOR gate 174 if the bus clear signal BSMCLR+ is received or if the second half bus cycle has been completed as indicated by the mYAKN+ signal. The MYAKN+ signal is derived from one of the outputs of element 166 to be hereinafter discussed, it being noted at this point that the flip-flops in element 166 are clocked by the BSDCND+ signal and cleared by the BSDCNB− signal via inverter 182.

Thus, AND gate 160 will be fully enabled if two of the inputs thereto indicate that this is the addressed device and that from the other input thereof, there has been a second half bus cycle as indicated via AND gate 170 from history flip-flop 172. Thus, by the enabling of AND gate 160, the MYAKN+ signal will be generated and will be coupled to one input of OR gate 176. The OR gate 176 will provide an ACK signal, (BSACKR−) via driver 178.

Gate 158 will be fully enabled when the proper unit address is received, if this is not a second half bus cycle and if the NAK history flip-flop 186 has not been set, which thereby generates a positive pulse labelled as the MYNAKR+ signal at the output of the respective flip-flop included in element 166. The MYNAKR+ signal causes the logic of FIG. 4 to generate a NAK signal via driver 180.

It is noted that the data processor logic in FIG. 4 generates either a NAK or ACK signal, however a WAIT signal is not so generated by the data processor logic. The reason for this is that the data processor always has the lowest priority and accordingly, if it generates a WAIT signal, the other devices generating their requests to the data processor for service will possibly experience a hangup on the bus, if, for example, a higher priority device was the master to which the central processor responded with a WAIT signal. Thus, just because the higher priority device is waiting for the lowest priority device, i.e. the central processor, other devices will be disabled from using the bus.

When a device, such as controller 56 for example, requires interrupt service from the processor 50 in which the logic of FIG. 4 is included, such device will first receive a NAK signal from processor 50 indicating to such device that it should try the interrupt again. This is done for synchronization purposes. The fact that such interrupting device did try to interrupt the processor is stored in the logic of FIG. 4 and when again interrupted, the processor 50 will provide an ACK signal if all other conditions are met. When the processor however receives data from a device from which it is expecting a response as indicated by the second half read cycle history flip-flop, the above NAK response will not occur but rather, an ACK signal, if all other conditions are met, will be provided. The ACK or NAK signal to the interrupts is controlled by the function MYAKP which is set by a subcommand MYAKPS− which is received at the set input of flip-flop 186. Flip-flop 186 is reset by the fact that the interrupt was ACKed. Such subcommands may be generated under the control of a local memory sometimes referred to as a control store or firmware, or may in fact be controlled by special logic, the manner in which such signals being generated not being within the scope of the present invention.

Normally, flip-flop 186 is reset and accordingly the MYAKP− signal at the $\bar{Q}$ output thereof, which is coupled with one input of gate 158, is true or high. Further at the time of the interrupt, the function BSSHBC+ is low indicating an interrupt cycle. Accordingly, all of the inputs to gate 158 will be high thereby forcing the output thereof to be high so that upon the occurrence of the BSDCND+ signal, the $Q_0$ output of the top flip-flop of element 166 will be high which is the MYNAKR signal. This in turn, via driver 180, will provide the NAK signal to the bus 62. This NAK signal will be received by the interrupting unit. At the same time that the MYNAKR signal is high, the output of the middle flip-flop of element 166, i.e. the MYAKI+ signal will be low because of the fact that the MYAKP+ signal at the Q output of flip-flop 186 is low. Thus, what will happen is that the processor will generate a NAK signal to the interrupting device such as the controller 56 by means of driver 180. The fact that the top flip-flop of element 166 generates the high state of the MYNAKR signal, will force flip-flop 184 to generate a high state at the Q output thereof because of the clocking of the +V or binary ONE input to the D input of flip-flop 184. Accordingly the high state of the FBINTF signal will be generated at the Q output of flip-flop 184. The FBINTF signal is completed at OR gate 142 as one of the controlled interrupts shown in FIG. 3. Thus the FINTRA interrupt signal will be generated in accordance with the operation of the logic of FIG. 3.

The fact that the FBINTF signal is generated at the Q output of flip-flop 184, is coupled to generate the MYAKPS− signal to effectively set flip-flop 186 and reset flip-flop 184. This coupling may be provided via control store 10 which is utilized in combination with other logic to determine the source of the interrupt and thereafter enable a branch to the bus interrupt handling routine which may be stored in memory 52. The FBINTF signal may, on the other hand for purposes of the present invention, be coupled directly to the MYAKPS− inputs. When the MYAKPS− signal is generated, the MYAKP+ signal goes high and in addition the FBINTF signal goes low. The processor is then set in the state whereby the processor is ready to ACK the next interrupt command received. The generation of the MYAKPS− signal indicates that the firmware is in the process of an interrupt service routine and this will effectively suppress any further interrupts since at the beginning of such interrupt service routine the FRSINT signal will be generated to start the timer 134 of FIG. 3. Thus interrupts are prevented from occurring back-to-back before the first interrupt received is serviced.

The processor of the present invention may include means by which a signal is provided on the bus to indicate to the previously interrupting device that in fact it may try to interrupt again. Thus at some time in the future, the previously interrupting device interrupts again or in fact another device may interrupt for the first time. Notwithstanding, once flip-flop 186 is set, the next device to interrupt the processor 50 will be ACKed, all other conditions being met. The processor 50 is set to ACK the next interrupt since all the inputs to gate 162 will be high thus causing signal MYAKI+ on the output of the middle flip-flop of element 166 to go high thereby causing, via OR gate 176 and driver 178, an ACK signal to be generated.

The fact that the MYAKI+ signal made the transition to the high state will also reset flip-flop 186 since such signal is coupled to the clock input which causes the ground or low level at the D input of flip-flop 186 to be received at the Q output thereof. In so resetting flip-flop 186, the processor is thereby in a state where all subsequent interrupts which are not part of the second half read cycle will be NAKed. Flip-flop 186 may also be reset by means of the MYAKPR− signal at the reset input of flip-flop 186. The MYAKPR− signal may be generated by means of for example the control store firmware such as, for example, when such flip-flop has been set for a period of time which is beyond that which is tolerated in the system. Thus, for example, a timer may generate a signal by which the MYAKPR− signal is generated so as to place the processor 50 in a condition whereby it will NAK the next interrupt. This is a situation, for example, where the device which previously interrupted and received a NAK signal, for some reason does not interrupt for a given period of time together with the condition where another device also does not interrupt the processor for a given period of time.

Having described the invention, what is claimed as new and novel and for which it is desired to secure Letters Patent is:

1. Interrupt apparatus for a data processing system said apparatus for selectively suppressing interrupts generated by a data processor and by peripheral devices connected to said processor, said apparatus comprising:
   A. first means for receiving a first plurality of said interrupts, each of said first plurality being a controlled interrupt;
   B. second means for receiving a second plurality of interrupts concurrently with the receipt of said first means for receiving, each of said second plurality being a privileged interrupt, said privileged interrupts having a higher priority than said controlled interrupts and each of said individual controlled and privileged interrupts having a predetermined priority corresponding to a particular service routine to be performed in said data processing system;
   C. first means, coupled with said first and second means for receiving, for suppressing the performance of the service routines corresponding to each of said controlled or privileged interrupts received by said first and second receiving means at a given time while a service routine corresponding to a previously received one of said controlled or privileged interrupts is being performed;
   D. second means coupled with said first means for receiving, for suppressing the performance of the service routines corresponding to each of said controlled interrupts received at said given time for the period of time required by said system to store status information relating to the routine being performed by said system at said given time;
   E. means coupled with said first and second means for suppressing, for generating an interrupt signal in response to receipt of one of said controlled or privileged interrupts not suppressed by either said first or second means for suppressing; and F. means, coupled with said means for generating and responsive to receipt of said interrupt signal for initiating the performance of the service routine corresponding to said one of said controlled or privileged interrupts not suppressed.

2. A system as in claim 1 wherein said first means for suppressing includes an interrupt timer, responsive to instructions from said processor, said timer generating a first suppression signal for the period of time required by said system to process the largest of the various interrupt service routines, said first suppression signal for suppressing the generation of the interrupt signal for allowing the service routine corresponding to said previously received interrupt to be performed.

3. A system as in claim 2 wherein said first means for suppressing includes means for resetting said interrupt timer after a predetermined time period required by said system to process the largest of the various interrupt service routines.

4. A system as in claim 1 wherein said second means for suppressing includes:
   A. means in said system for generating first and second signals in response to specific instructions of a program being executed;
   B. a first bistable means for receiving said first signal, said first bistable means having an output;
   C. second bistable means for receiving said second signal, said second bistable means having an output;
   D. means for coupling the output of said first bistable means to said second bistable means to produce the same effect on said second bistable means upon receipt of the output from said first bistable means as does receipt of said second signal; and
   E. a gate means for providing a second suppression signal, said gate means responsive to receipt of the outputs of said first and second bistable means for generating said second suppression signal in response to receipt of said second signal for a first predetermined period corresponding to the time said system takes to process an instruction, and for generating said second suppression signal in response to receipt of said first signal for a period which is twice said first predetermined period.

5. A system as in claim 4 also including:
   A. a control element including means for generating a control element interrupt when said system is to be controlled by an operator;
   B. means for receiving said control element interrupt from said control element; and
   C. means responsive to receipt of said control element interrupt and coupled to said means for initiating for generating said interrupt signal independent of the operation of said first means for suppressing.

6. A system as in claim 1 wherein each of said first and second means for receiving includes:
   A. a plurality of bistable means, each for receiving an interrupt for temporary storage of an indication of such interrupt therein;
   B. a priority encoder, coupled with each of said bistable means, for generating an encoded representation of the highest priority one of said interrupts received by said bistable means; and
   C. means for storing said encoded representation in response to a clock signal whereby any other interrupt received by said bistable means will not be operated upon until the service routine corresponding to the interrupt indicated by said encoded representation has been performed.

7. A system as in claim 6 wherein each of said first and second means for receiving also includes:

A. decoder means coupled to said storing means for decoding said encoded representation to provide a decoded output; and
B. means, responsive to said decoded output, for clearing the bistable means which produced said encoded representation stored in said means for storing, for enabling said bistable means so cleared to receive another interrupt.

8. A system as in claim 1 also including means for enabling the service routine corresponding to a received one of said privileged interrupts to be performed before the service routine corresponding to a received one of said controlled interrupts.

9. A system as in claim 1 wherein said system is included in a central processor and wherein said system includes a plurality of other devices coupled to communicate with said processor, said devices coupled for generating an external interrupt for receipt by said processor, said external interrupt being included in said plurality of controlled interrupts, said system further comprising:
   A. means, responsive to an initial receipt of a said external interrupt, for providing a negative acknowledgement to the deivce providing said external interrupt thereby indicating that said external interrupt will not be operated on until the interrupt is received again;
   B. means, responsive to said initial receipt of said external interrupt, for storing an indication of such receipt; and
   C. means, responsive to the receipt of an external interrupt from any one of said devices, and responsive to the indication of said initial receipt in said means for storing, for providing a positive acknowledgement to said device providing such external interrupt and for enabling said interrupt signal to be generated if said external interrupt is the highest priority received interrupt and said first and second means for suppressing are not enabled.

10. A system as in claim 5, wherein said means for receiving said control element interrupt includes means responsive to receipt of said second suppression signal for suppressing said control element interrupt.

11. A system as in claim 10, also including means in said system responsive to instructions from said processor for generating a third suppression signal; and third means responsive to receipt of said third suppression signal for suppressing said control element interrupt to allow execution of a program in said system to begin.

12. The system as in claim 1, wherein said means for generating an interrupt signal includes:
   A. means for generating a first predetermined output in response to receipt of at least one of said controlled interrupts;
   B. means for generating a second predetermined output in response to receipt of at least one of said privileged interrupts;
   C. gate means responsive to receipt of said first or second predetermined outputs for generating a third predetermined output;
   D. a bistable element having a clock enabling input, for receiving the third predetermined output from said gate means upon the occurrence of a clock signal received at said clock enabling input, said element generating a fourth predetermined output in response to receipt of said third predetermined output; and
   E. means responsive to said fourth predetermined output for generating the interrupt signal.

* * * * *